United States Patent [19]

Kennedy et al.

[11] Patent Number: 5,435,564

[45] Date of Patent: Jul. 25, 1995

[54] ELECTRONIC WORD BUILDING MACHINE

[75] Inventors: Stephen Kennedy, Mt. Laurel; David McWherter, Lumberton, both of N.J.

[73] Assignee: Franklin Electronic Publishers, Incorporated, Mt. Holly, N.J.

[21] Appl. No.: 173,643

[22] Filed: Dec. 22, 1993

[51] Int. Cl.⁶ .............................................. G06F 15/16
[52] U.S. Cl. ................... 273/237; 273/272; 273/273; 273/460; 273/430; 434/169; 434/177
[58] Field of Search .......... 273/237, 272, 273, 148 R, 273/460, 430; 434/169, 177; 364/419

[56] References Cited

U.S. PATENT DOCUMENTS

| 1,553,835 | 9/1925 | Peters | 273/272 |
| 4,411,628 | 10/1983 | Laughon et al. | 434/169 |
| 4,590,560 | 5/1986 | Sado | 364/419 |
| 4,627,023 | 12/1986 | Hashimoto et al. | 434/169 X |
| 4,891,775 | 1/1990 | McWherter | 434/169 X |
| 4,961,579 | 10/1990 | Thompson et al. | 434/169 X |
| 5,203,705 | 4/1993 | Hardy et al. | 434/169 |
| 5,249,965 | 10/1993 | Yianilos | 434/177 |

Primary Examiner—V. Millin
Assistant Examiner—Kerry Owens
Attorney, Agent, or Firm—McAulay Fisher Nissen Goldberg & Kiel

[57] ABSTRACT

An electronic word building machine including a keyboard to input a user determined set of letters, a set of words in memory, a comparison program to compare the input set of letters with the set of words in memory to provide a set of matching words from the set of words in memory, the set of matching words including words which consist only of a subset of letters from the input set of letters, a ranking program to provide a predetermined score for each of the words in the set of matching words, and a display to display on the machine each of the words in the sequence of the value of the score together with the score value of the word being displayed.

7 Claims, 2 Drawing Sheets

ELECTRONIC WORD BUILDING MACHINE

BACKGROUND OF THE INVENTION

This invention relates in general to an electronic letter arranging device and in particular to one having utility as an aide to playing the word game SCRABBLE®.

This application is related to co-pending application Ser. No. 07/926,050, filed Aug. 6, 1992, commonly assigned with the present invention.

An appendix consisting of three (3) pages of computer code written in the C programing language, including notations, is included as a part of the specification.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright fights whatsoever.

A crossword puzzle solving electronic device in which the user enters a partial word using special characters to indicate the unknown letters is known. In such a machine, a seven letter word, for example, may be entered in which two of the letters (the second and fourth) are not known. This is a typical situation encountered while solving a crossword puzzle. When a partial word is entered, a search routine is undertaken in which the partial word is matched against every word in the set of words held in memory. For the above example, each word having the seven letters entered in that letter position is displayed on a screen. In this fashion, each possible solution for the partial word in the crossword is provided to the user. The user can then select whichever word appears to be most appropriate to the clue provided with the puzzle or to assist in solving a word that rum crosswise to a position in the partial word that has been entered.

While the cross-word puzzle solving device may be used to some degree while playing the word game SCRABBLE®, the cross-word puzzle solving device requires that the user know the exact number of letters of a word to be placed. While this feature is critical to solving cross-word puzzles, it is extremely limiting with respect to playing other word games. Furthermore, the limited assistance which may be gained by using the cross-word puzzle solving device is further limited with respect to playing the SCRABBLE® word game due to its failure to consider the letters held by the player, as well as the objective of maximizing word score.

In addition, a SCRABBLE® players dictionary is available in printed form, however, the user must know, at least the first few consecutive letters of the word before he or she may use the dictionary effectively.

In playing the word game SCRABBLE® with the aid of the dictionary, therefore, not only must the player isolate a possible location on the playing board for the placement of a word, the player must also select the first letter(s) of the word to be placed. As a result, the player is limited by both his or her vocabulary, as well as ability to locate a position on the board for placing a word.

Moreover, not only must the player place a word on the playing board, the player must strategically use the letters he or she currently holds, the letters previously placed on the board, and the various word score and letter score multipliers provided on the board to maximize his or her score.

BRIEF DESCRIPTION

Accordingly, one object of the invention is to provide a hand held electronic SCRABBLE® dictionary for presenting the user with a list of words for placement on the SCRABBLE® playing board.

Another object of the invention is to assist the user in maximizing his or her score, accounting for both the letters currently held, the letters previously placed on the board, and the letter-score multipliers provided on the board.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

According to the present invention, the foregoing and other objects and advantages are attained by a hand held electronic word forming device. The user inputs information relating to positions available on the SCRABBLE® playing board for word placement using the keyboard. The keyboard permits the operator to input letter(s) currently on the playing board, spacing arrangements relating to the letter(s) entered and letter score multipliers provided on the playing board. The keyboard also permits the user to enter the letters currently held by the user.

The memory of the device contains a predetermined set of words. Based upon the information provided by the user, the device identifies a subset of words which fit the pattern entered by the user and includes a combination of the letters on the playing board and the letters held by the user.

In accordance with an aspect of the invention, the device also has the letter scores assigned in the SCRABBLE® word game in memory. Using the assigned letter scores, as well as the letter score multipliers entered by the user, the device displays the subset of words which fit the pattern and include a combination of the letters on the playing board and held by the player, as well as the score associated with each word. For efficiency, the words and associated scores may be presented in score order with the highest score word displayed first on the display.

Still other objects and advantages of the present invention will become readily apparent to those skilled in the art from the following detailed description, wherein only the preferred embodiment of the invention is shown and described, simply by way of illustration of the best mode of carrying out the invention. As will be realized, the invention is capable of other and different embodiments and its several details are capable of modifications in various obvious respects, all without departing from the invention. Accordingly, the drawing and description are to be regarded as illustrative in nature, and not as restrictive.

The apparatus of the present invention, thus assists the SCRABBLE® word game player to maximize his or her score using information which is provided by the player relating to the letters currently held by the player, and both the physical arrangement of the letters and letter score multipliers on the playing board.

DETAILED DESCRIPTION OF THE INVENTION

Figure 1:
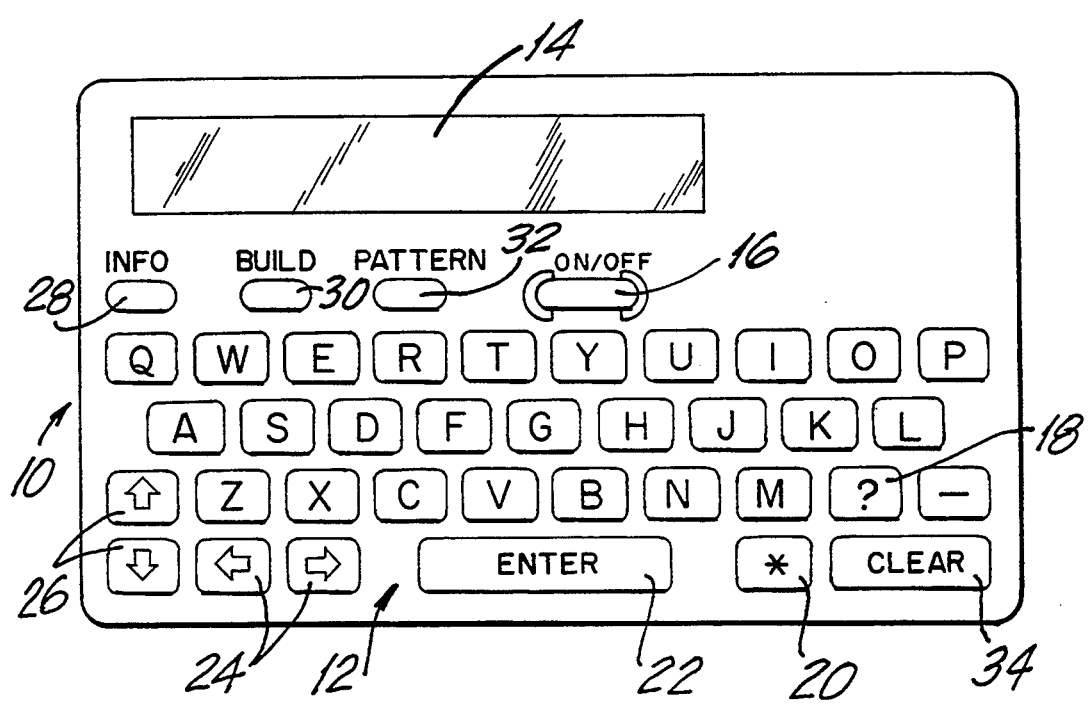
FIG. 1 is a top plan view of an electronic world building machine according to a first embodiment of the present invention.
Figure 2:
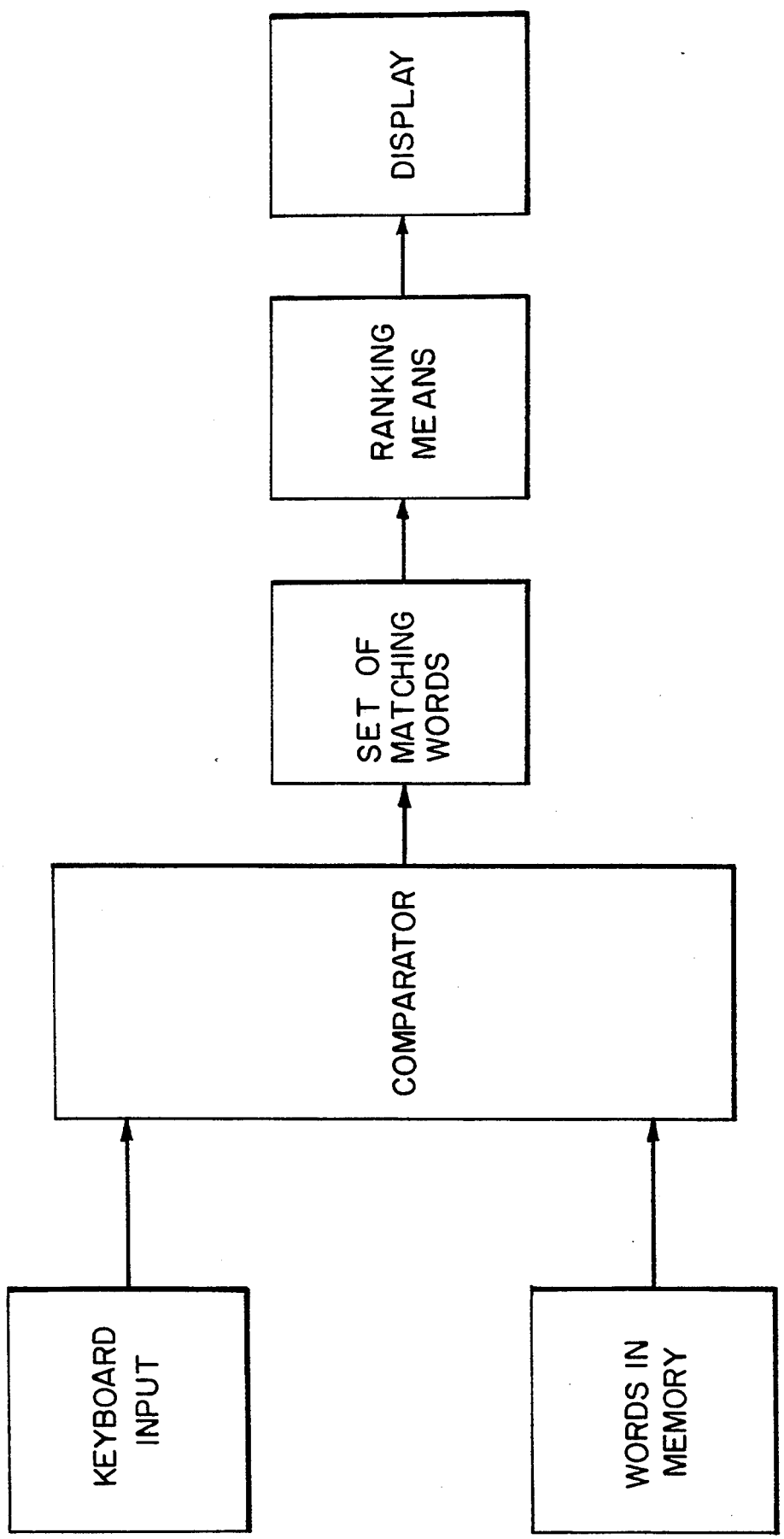
FIG. 2 is a block diagram further illustrating the embodiment of FIG. 1.

An electronic SCRABBLE ® Players Dictionary 10 of the present invention is illustrated in FIGS. 1 and 2. Electronic dictionary 10 includes keyboard 12 and display 14. Keyboard 12, aside from having keys representing each letter of the alphabet, includes additional function keys.

The additional function keys include:

ON/OFF key 16 for turning the power to the Electronic Dictionary 10 on and off;

A single letter identifier key 18, designated in the embodiment shown in FIG. 1 with a "?";

A multiple letter identifier key 20 which considers a variable number of unknown letters or blank spaces, designated in the embodiment shown in FIG. 1 as a "*";

ENTER key 22 for instructing the electronic dictionary to process the information input by the user;

Horizontal arrow keys (←→) 24 for scrolling and erasing;

Vertical arrow keys (↑ ↓) 26 for adjusting contrast and scrolling through lists;

INFO key 28 for retrieving additional information regarding the information displayed;

BUILD key 30 for retrieving a list of words in word score order according to the information which the user had entered;

and, PATTERN key 32 for informing the electronic dictionary 10 that the characters previously entered by the user represent letter and space arrangement of an area on the playing board.

The user may employ electronic dictionary 10 to build words solely considering the letter tiles held. For example, if the user holds the following seven letters; Y, M, R, Y, G, Z, and U, then the player would enter the seven letters, in random order, using the letter keys on keyboard 12. In the event of an error, the user may erase any of the letters using the left horizontal arrow key (←) 24. Once the tiles held by the player are entered, the user presses BUILD key 30 to obtain a list of words and their associated SCRABBLE ® scores. By depressing, BUILD key 30, the user activates a comparison program to compare the letters input with the predetermined set of words stored in dictionary 10 to obtain a subset of words. Once completed, dictionary 10 calculates word scores and arranges the subset according to word score, highest score first.

When finished processing, electronic dictionary 10 displays a word and score, if available, using the letters entered by the user. According to the letters listed above, display 14 would illustrate the following message:

```
25 ZYMURGY  ↓
```

This indicates that the associated SCRABBLE ® score is 25 and the word ZYMURGY is the highest word score available using the letters entered by the user. In the event that no words could be built from the letters entered, a "SORRY CAN'T HELP" message will be displayed on display 14.

The downward arrow (↓) on the right of display 14 indicates that at least one additional word and score is available. The user presses the down arrow key (↓) 26 to see additional words and scores. At any word, the user may press ENTER key 22 to obtain a definition. When finished, the user presses the clear function key 34 to clear display 14.

The SCRABBLE ® word game includes a few blank tiles which may be selected by the user. If, for example, the user holds the letters: D, O, L, S, T, and Y, as well as a blank tile, the user may enter the letters in any order, using the letter keys on keyboard 12 and the single letter identifier key 18 to indicate the blank tile with the identifier "?". Once the letters are displayed on display 14, the user then presses BUILD key 30 to obtain a SCRABBLE ® list. Note however, dictionary 10 will not accept the multiple letter identifier (*), during this procedure. As discussed above, by depressing BUILD key 30, the user activates comparison and ranking programs to obtain a list of words arranged in score order, highest score first.

Electronic dictionary 10 may also be used to determine placement of letters held by the player into patterns currently available on the playing board.

For example, assuming the word ART is currently placed on the playing board and spaces are empty both before the A and after the T. The user may search for words which contain the word ART. For example, assuming the player has the tiles X, Y, S, U, T, H, and Q; at the READY message the user enters the word ART and presses PATTERN key 32. Depressing PATTERN key 32 instructs the electronic dictionary 10 to store the previously entered characters as a pattern to be used in a later search routine. The player then enters the letters currently held, depressing either ENTER key 22 or BUILD key 30 to activate the comparison and ranking programs.

Electronic dictionary 10 treats the word ART as if it had an asterisk (*) both before the A and after the T. Accordingly, the comparison program will retrieve any words from the stored list which contain the word ART and any of the letters held by the player. After processing, display 14 appears as follows:

```
15  quarts       ↓
``` scrolling through the list results in the following displays:

```
14  quart    ↕
 8  artsy    ↕
 8  harts    ↕
 8  tarty    ↕
 7  arty     ↕
 7  hart     ↕
 5  start    ↕
 5  tarts    ↕
 4  arts     ↕
 4  tart     ↕
 3  art      ↑
```

Notice, the word ART appears at the beginning, middle or end of the listed words. The double arrow identifier (↕) indicates that words are available both above and below the word being viewed. Upward arrow (↑) indicates the end of the list.

On occasion, available spacing and/or patterns on the playing board are restricted at one or both ends. Accordingly, the user must inform electronic dictionary 10 of such restrictions. For example, assuming that the pattern on the playing board has the letters AH, the H being located at the edge of the playing board, the player would enter the characters *AH. The combination of placing the multiple letter identifier character (*) at the left end while placing no special character at the right end instructs electronic dictionary 10 that the list of words must end in the letter AH, while being unbounded on the left end. In the event that the pattern is limited on the left side by a specific number of spaces, the player may enter a series of single space identifiers (?) to inform electronic dictionary 10 of the limitations.

After entering the pattern *AH, the user depresses PATTERN key 32 to instruct electronic dictionary 10 that *AH represents a pattern. Similar to the above mentioned examples, the user enters his or her letters and depresses ENTER key 22 or BUILD key 30 to activate the comparison and ranking programs to provide a list of possible words in score-order on display 14.

In addition, a pattern may exist in which a few spaces are bounded by placed tiles. Assuming the playing board appears as follows:

|   |   |   |   |   |   |   |
|---|---|---|---|---|---|---|
|   | L |   | A |   |   |   |
|   | I |   | R |   |   |   |
|   | D | E | L | T | A |   | the user may use the L in LID and the A in ART to build a word horizontally. In this fashion, therefore, the player enters the pattern * L ? ? A * and depresses PATTERN key 32. The remaining steps continue as discussed previously to obtain a list of words.

The user may restrict the number of spaces on either side of the pattern L ? ? A by replacing the * with nothing or a single or series of single letter identifier(s) (?).

The ranking program of electronic dictionary 10 also accounts for letter-score multipliers on the playing board. Assuming the playing board appears as follows:

|   | A | Double Letter Score |   | Double Letter Score | T |
|---|---|---|---|---|---| the user must enter a pattern reflective of the letter-score multipliers. According, the pattern entered appears as follows: * a 2 ? 2 t *

Since keyboard 12 does not have a character 2, the user enters a 2 by depressing single letter identifier key (?) 18, followed by upward vertical arrow key ( ↑ ) 26.

To enter a triple letter score multiplier, the user depresses single letter identifier key (18), followed by depressing upward vertical arrow key ( ↑ ) 26 twice.

After entering the pattern, the user depresses PATTERN key 32 and follows the steps previously outlined to obtain a list of words. When the user enters letter score multipliers, however, the ranking program accounts for the letter score multiplier in calculating the associated word scores and placing the words in score order.

The comparison program employs a tree data structure to store and traverse through a word list. The words are stored as a series of connected letter branches. For example, a portion of a tree branch appears as follows:

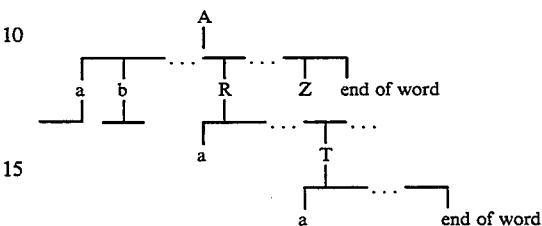

The word ART is represented by, A-R-T- end of word, each character initiating a separate branch of the tree data structure.

The comparison program generates letter sequences using the pattern and letters entered by the user. When a letter is found which is neither part of the pattern nor one of the letters entered by the user, the comparison program no longer traverses the remainder of the tree branch. The comparison program then searches other tree branches. When the end of a word in the word list is found, the comparison program tests the word to verify that it matches the pattern entered.

When a match is found, the match is added to a list of other words previously matched and arranged according to SCRABBLE ® word scores.

What is claimed is:

1. An electronic word building dictionary machine comprising:
   keyboard means to input a user determined set of letters,
   a set of words in memory,
   comparison means to compare said input set of letters with said set of words in memory to provide a set of matching words from said set of words in memory, said comparison means including means for treating said variable letter member as a sequence of letters of the alphabet, said sequence at least one letter of the alphabet and said set of matching words comprising words which consist only of a subset of letters from said input set of letters,
   ranking means to provide a predetermined score for each of said words in said set of matching words,
   display means to display on said machine each of said words in the sequence of value of said score together with the score value of the word being displayed,
   wherein said keyboard means has a second input key representing a variable number of letters to provide a variable letter member of said user determined set of letters.

2. The electronic word building machine of claim 1 wherein: said keyboard means has a first input key representing a single variable letter to provide a single variable letter member of said user determined set of letters,
   said comparison means including means for treating said single variable letter member as each letter of the alphabet.

3. The electronic word building machine of claim 1, wherein said score value is calculated according to letter scores assigned in the SCRABBLE® word game.

4. The electronic word building machine of claim 1 wherein said keyboard includes a definition retrieval key, said definition retrieval key retrieving a definition of a word displayed by said display means.

5. The electronic word building machine of claim 1 further comprising:

second input means to input a user determined second predetermined set of letters in a predetermined sequence as a pattern set, said pattern set being part of said input set of letters, said comparison means including said pattern set as a necessary part of each of said set of matching words.

6. The electronic word building machine of claim 5 wherein said pattern set includes identifiers selected from the group of identifiers consisting of: the letters of the alphabet, single letter members, variable letter members, and letter score multipliers.

7. The electronic word building machine of claim 1 wherein said display means displays an indicator to inform the user that additional word and additional score information is available.

* * * * *

UNITED STATES PATENT AND TRADEMARK OFFICE
CERTIFICATE OF CORRECTION

PATENT NO. : 5,435,564

DATED : July 25, 1995

INVENTOR(S) : Stephen Kennedy & David McWherter

It is certified that error appears in the above-identified patent and that said Letters Patent is hereby corrected as shown below:

Column 6:

Claim 1, line 10: Cancel "said" and insert therefor --a--;
            line 11: After "sequence" insert --having--;
            line 21: Cancel "second" and insert therefor --first--; and,
            line 22: Cancel "a" and insert therefor --said--.

Claim 2, line 2: Cancel "first" and insert therefor --second--.

Column 7:
    Claim 4, line 2: After "keyboard" insert --means--.

Claim 5, line 3: Before "input means" cancel "second".

Signed and Sealed this

Twenty-third Day of January, 1996

*Attest:*

BRUCE LEHMAN

*Attesting Officer*      *Commissioner of Patents and Trademarks*